US012371253B1

(12) United States Patent
Kassis

(10) Patent No.: US 12,371,253 B1
(45) Date of Patent: Jul. 29, 2025

(54) GARBAGE CAN LID AND CONTAINER

(71) Applicant: Nader Kassis, New Hyde Park, NY (US)

(72) Inventor: Nader Kassis, New Hyde Park, NY (US)

( * ) Notice: Subject to any disclaimer, the term of this patent is extended or adjusted under 35 U.S.C. 154(b) by 42 days.

(21) Appl. No.: 18/214,913

(22) Filed: Jun. 27, 2023

(51) Int. Cl.
*B65F 1/16* (2006.01)
*B65F 1/14* (2006.01)

(52) U.S. Cl.
CPC .......... *B65F 1/1615* (2013.01); *B65F 1/1473* (2013.01)

(58) Field of Classification Search
CPC ............ B65F 1/16; B65D 43/20; B65D 43/00
USPC ....... 220/350, 345.1, 908; 160/201; 206/816
See application file for complete search history.

(56) References Cited

U.S. PATENT DOCUMENTS 2,107,997 A * 2/1938 Horsley ................. A45C 13/16 312/297
2,661,119 A * 12/1953 Spiess, Jr. .............. B65D 43/20 220/815
2,690,216 A * 9/1954 Scott ....................... E06B 9/115 16/385
2,739,730 A * 3/1956 Jonas ........................ B65F 1/16 312/297
3,330,611 A * 7/1967 Heifetz ................... E06B 9/115 312/297
3,687,328 A * 8/1972 Spruyt ................... B65D 43/14 220/908
4,162,024 A * 7/1979 Shanley ................. B65D 43/20 217/62
4,275,667 A * 6/1981 Hilton .................... B65H 1/027 217/62
4,351,435 A * 9/1982 Elwert ................... B25H 3/003 220/350
4,432,591 A * 2/1984 Rinkewich ................ E06B 9/15 312/297

(Continued)

FOREIGN PATENT DOCUMENTS

JP 4473170 B2 6/2010

OTHER PUBLICATIONS

Tablet cassette. Patent Translation [online]. https://patents.google.com/ [retrieved on Jan. 27, 2023]. Retrieved from the Internet: <URL: https://patents.google.com/patent/JP4473170B2/en?oq=4%2c473%2c170>.

*Primary Examiner* — Anthony D Stashick
*Assistant Examiner* — Prince Pal
(74) *Attorney, Agent, or Firm* — Cramer Patent & Design, PLLC.; Aaron R. Cramer

(57) ABSTRACT

The garbage can lid and container is an outdoor trash can with a retractable attached lid. The device of the instant application is provided with a track system that allows the lid to roll up and retract along the rear of the can. This feature allows full access to the interior of the trash can, but also keeps the lid attached when either opened or closed. As such, the present device prevents the lid from being blown off or lost. It also keeps the lid closed preventing water from accumulating when raining. Such a capability also eliminates mosquito breeding grounds. The lid can be opened with only one hand making it easy to use, especially when holding a bag of trash. The device may also be provided with a hasp that can hold a padlock to protect personal information and dumping of trash by others. The device may assist garbage men in lifting and moving the can and keep animals out of the garbage.

1 Claim, 4 Drawing Sheets

(56) References Cited

U.S. PATENT DOCUMENTS

| | | | | | |
|---|---|---|---|---|---|
| 4,955,501 | A * | 9/1990 | Hodge | E05B 73/0005 | 70/164 |
| 5,065,341 | A | 11/1991 | Gruner et al. | | |
| 5,107,990 | A * | 4/1992 | Wicherski | A61M 5/3205 | 206/366 |
| 5,217,136 | A * | 6/1993 | Sanden, Jr. | B65F 1/1646 | 220/908 |
| 5,295,605 | A * | 3/1994 | Kawahito | B01J 3/03 | 220/240 |
| D349,795 | S * | 8/1994 | Schauer | D34/1 | |
| 5,474,341 | A * | 12/1995 | Putman | B65F 1/1615 | 414/407 |
| D371,217 | S * | 6/1996 | Kim | D27/102 | |
| 5,758,914 | A | 6/1998 | Ioveno | | |
| D396,972 | S * | 8/1998 | Van De Oudeweetering | D34/21 | |
| 5,957,319 | A | 9/1999 | Mowbrey et al. | | |
| 6,318,579 | B1 * | 11/2001 | Leess | B65F 1/1615 | 220/345.2 |
| 6,655,443 | B2 * | 12/2003 | Mochizuki | E06B 9/15 | 160/229.1 |
| 8,210,383 | B1 * | 7/2012 | Devita | B65F 1/1615 | 220/345.2 |
| 8,348,080 | B2 * | 1/2013 | Baptiste | B65F 1/1468 | 220/908 |
| 8,348,081 | B2 * | 1/2013 | Baptiste | B65F 1/1468 | 220/908 |
| 8,579,151 | B2 * | 11/2013 | Kodama | B60R 7/04 | 312/297 |
| 8,720,686 | B1 * | 5/2014 | Shuman | B65F 1/14 | 220/908 |
| 8,931,655 | B2 * | 1/2015 | Stone | B65F 1/1607 | 220/212 |
| 9,856,079 | B2 * | 1/2018 | Manssourian | B65F 1/1615 | |
| 10,301,110 | B2 * | 5/2019 | Parker | B65F 1/1615 | |
| 10,618,730 | B2 * | 4/2020 | Manssourian | B65F 1/1615 | |
| 11,046,511 | B1 * | 6/2021 | Cohen | B65D 43/22 | |
| D953,677 | S * | 5/2022 | Yoshikawa | D34/7 | |
| 12,024,362 | B2 * | 7/2024 | Hardman | B65F 1/068 | |
| 2003/0230900 | A1 * | 12/2003 | Bergdoll | B65F 1/1615 | 292/1 |
| 2004/0065666 | A1 * | 4/2004 | Walker | B65F 1/1615 | 220/318 |
| 2004/0149401 | A1 * | 8/2004 | Rinkewich | E06B 9/15 | 160/235 |
| 2005/0126405 | A1 * | 6/2005 | Imperato | B30B 9/3017 | 100/240 |
| 2006/0000836 | A1 | 1/2006 | Lee et al. | | |
| 2006/0006177 | A1 * | 1/2006 | Clark | B65D 88/125 | 220/200 |
| 2008/0110895 | A1 * | 5/2008 | Baptiste | B65F 1/16 | 220/908 |
| 2009/0184124 | A1 * | 7/2009 | Tubman | B65F 1/1468 | 220/345.1 |
| 2009/0206569 | A1 * | 8/2009 | Begin | B62B 3/04 | 280/47.35 |
| 2010/0025856 | A1 | 10/2010 | Lee et al. | | |
| 2012/0024857 | A1 * | 2/2012 | Kodama | A45C 13/16 | 220/350 |
| 2013/0026166 | A1 * | 1/2013 | Stone | B65F 1/1607 | 220/254.1 |
| 2013/0270274 | A1 * | 10/2013 | Pizzella | B65F 1/10 | 220/350 |
| 2013/0284306 | A1 * | 10/2013 | Carlson | B65D 25/32 | 414/800 |
| 2015/0175352 | A1 * | 6/2015 | Jacobson | B65F 1/16 | 220/375 |
| 2016/0052714 | A1 | 2/2016 | McDade et al. | | |
| 2018/0251072 | A1 * | 9/2018 | Taniguchi | B60R 7/04 | |
| 2019/0031391 | A1 * | 1/2019 | Montanari-Ibarra | F25D 25/022 | |
| 2019/0359387 | A1 * | 11/2019 | Sofy | B62B 5/067 | |
| 2020/0102119 | A1 * | 4/2020 | Cyzen | B25H 3/00 | |
| 2020/0130893 | A1 * | 4/2020 | Väin | G06Q 10/08 | |
| 2021/0206322 | A1 * | 7/2021 | Izume | B65D 43/20 | |
| 2021/0339948 | A1 * | 11/2021 | McCloughen | B65F 1/1615 | |
| 2023/0019028 | A1 * | 1/2023 | Tull | B65D 45/16 | |

* cited by examiner

GARBAGE CAN LID AND CONTAINER

RELATED APPLICATIONS

None.

FIELD OF THE DEVICE

The present device relates generally to a garbage can lid and container and more specifically to a garbage can lid and container that is retractable and lockable.

BACKGROUND OF THE DEVICE

The removal of garbage from wastebaskets and other containers that are often present in the average home in the United States is one of the several errands that we must perform on a regular basis. The majority of the time, rubbish of this kind is deposited into enormous trash cans that are situated outside of the house. The majority of residences do not have designated areas that shield trash cans from the outdoors, so most trash cans are left outside where they are subject to the elements. Because of this, when there is a strong wind, the lids of garbage cans frequently get blown off, which causes waste to be scattered all over the yard and the neighborhood. Because of this, there is a condition that is not only unpleasant to look at but also unclean. In addition, time is wasted searching for the cans and lids that correspond to them. If the tin cans and/or their lids are completely misplaced, there will be a financial outlay to replace them.

Last but not least, garbage cans that do not have lids can easily become a breeding ground for mosquitoes if they are left open and exposed to rain. As a consequence of this, there is a demand for a method by which lids of garbage cans can be securely attached to trash cans regardless of whether the lids are open or closed. Use of the garbage can and lid fulfills this need in a manner that is efficacious and cost effective.

SUMMARY OF THE DEVICE

Embodiments of the present disclosure may include a garbage can lid and container including a garbage can. Embodiments may also include a sliding shutter lid. Embodiments may also include a pair of tracks coupled to the garbage can. Embodiments may also include a clamp-on handle coupled to the garbage can.

In some embodiments, the sliding shutter lid may be guided by the pair of tracks. In some embodiments, the garbage can may be operable to store trash intended for collection by a garbage truck. In some embodiments, the sliding shutter lid prevents rain from entering the garbage can. In some embodiments, the sliding shutter lid prevents animals from accessing the trash placed into the garbage can.

In some embodiments, the sliding shutter lid opens by sliding rearward to permit access to an interior of the garbage can. In some embodiments, the garbage can may include a trash container with four side panels, a bottom panel, and an open top.

Embodiments may also include g a lid latch engaged to prevent the sliding shutter lid from opening. Embodiments may also include the pair of tracks which may include a left side track and a right side track coupled to the top and rear of the trash container.

In some embodiments, the left side track and the right side track follow congruent paths along the top of the trash container and down the rear of the trash container, maintaining a constant separation distance.

In some embodiments, the separation distance conforms to a width of the sliding shutter lid, allowing the sliding shutter lid to slide within the pair of tracks. Embodiments may also include a sliding shutter lid partially extends down a front of the trash container to cover a lower front.

In some embodiments, the pair of tracks bend towards the center of the garbage can at the front and may be joined, limiting forward motion of the sliding shutter lid during closing. Embodiments may also include a pair of wheels coupled to the garbage can to reduce friction during movement.

In some embodiments, the pair of wheels may include a left wheel and a right wheel rotationally coupled to an axle coupled to the bottom rear of the trash container. Embodiments may further include a lid latch coupled to a front center of the trash container, engaging a lid front handle to prevent the sliding shutter lid from sliding.

Embodiments may also include a sliding shutter lid which may include a plurality of panel segments pivotably coupled to each other by hinges and oriented to extend laterally between the pair of tracks.

In some embodiments, the hinges may be living hinges. Embodiments may also a clamp-on handle detachably coupled to the garbage can. In some embodiments, the clamp-on handle may include a handlebar. Embodiments may also include a left side clamp. Embodiments may also include a right side clamp. In some embodiments, the clamp-on handle facilitates moving the garbage can.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
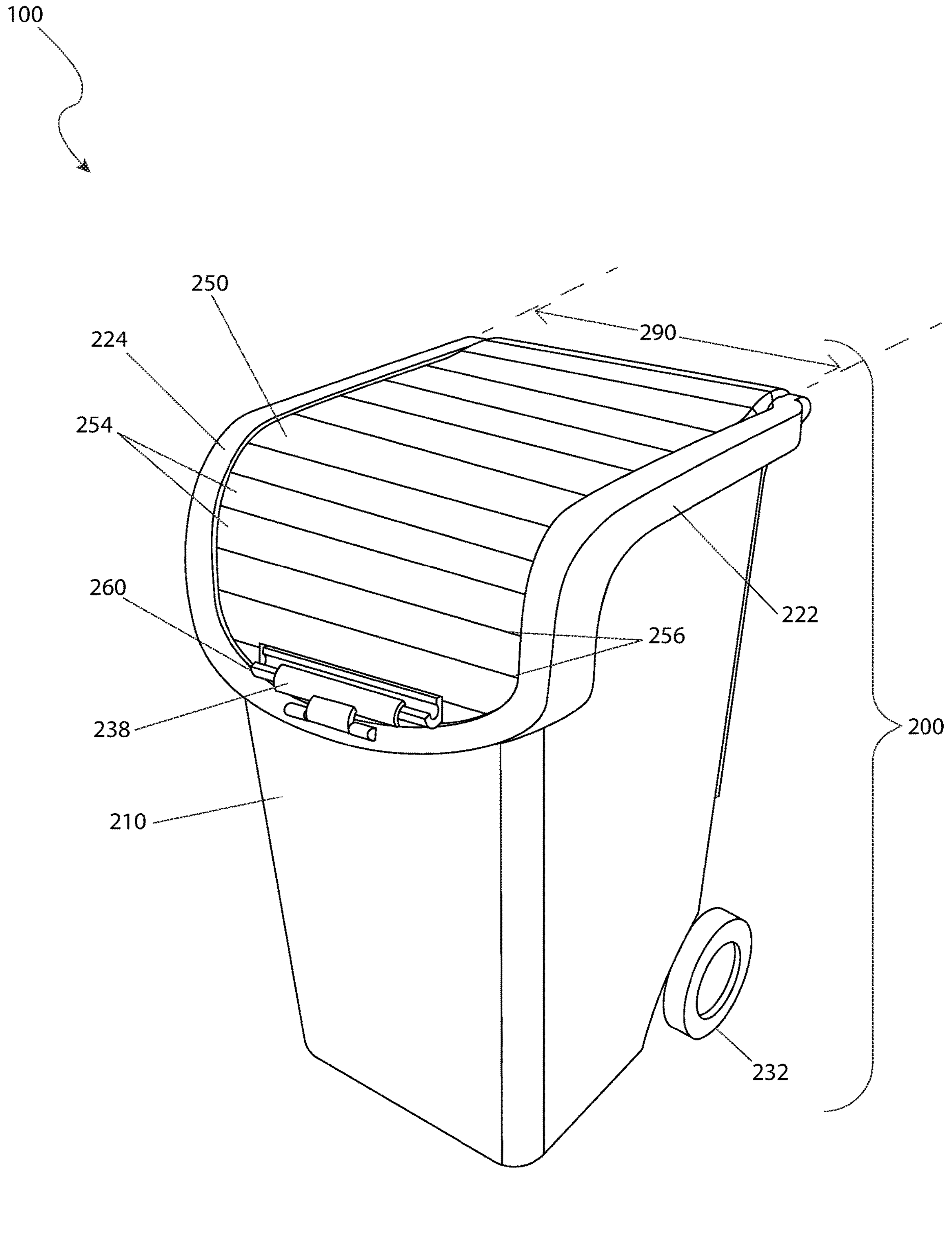
FIG. 1 is a front isometric view of a garbage can lid and container 100, according to an embodiment of the present device.
Figure 2:
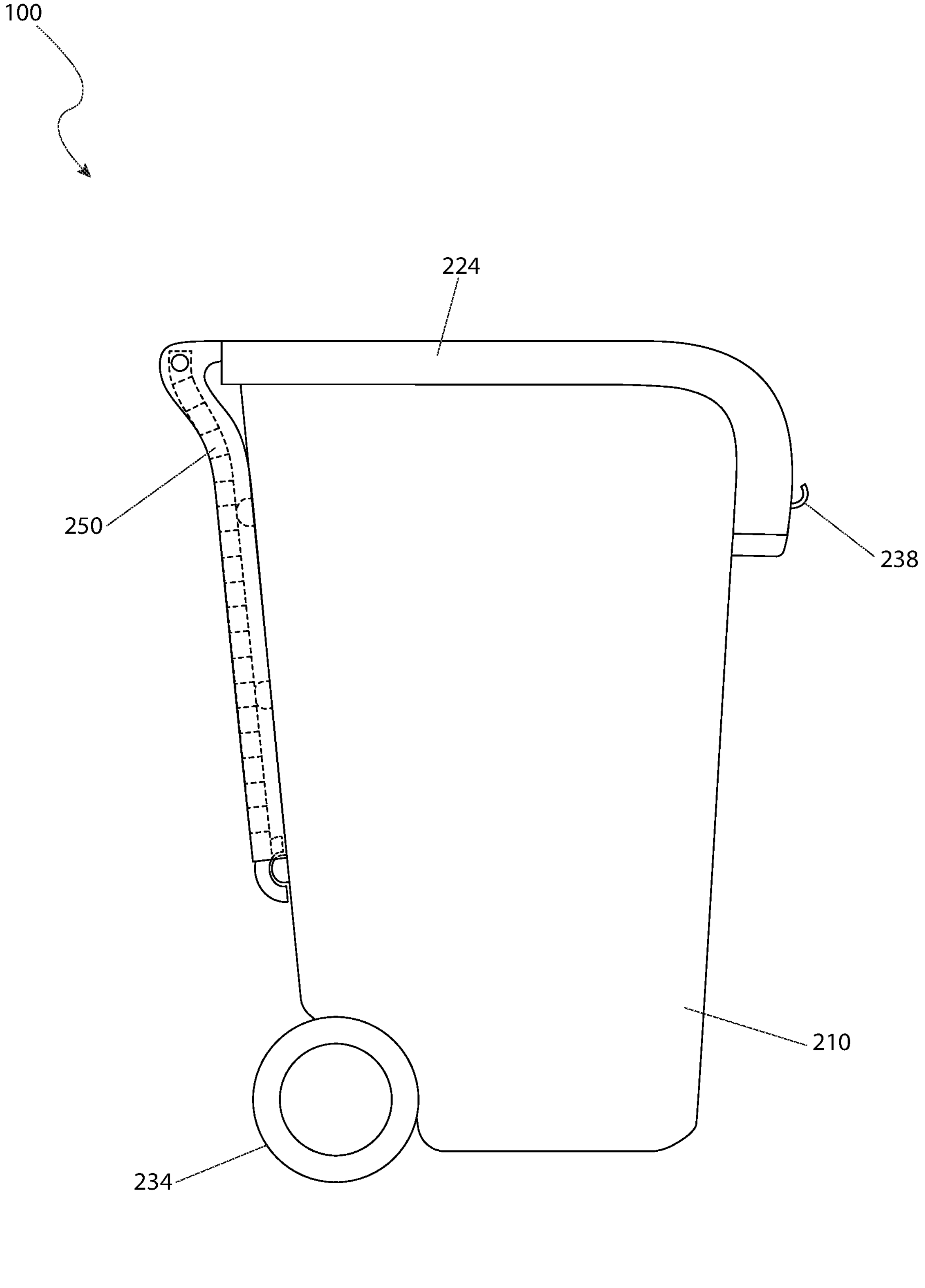
FIG. 2 is a side view of a garbage can lid and container 100, according to an embodiment of the present device.
Figure 3:
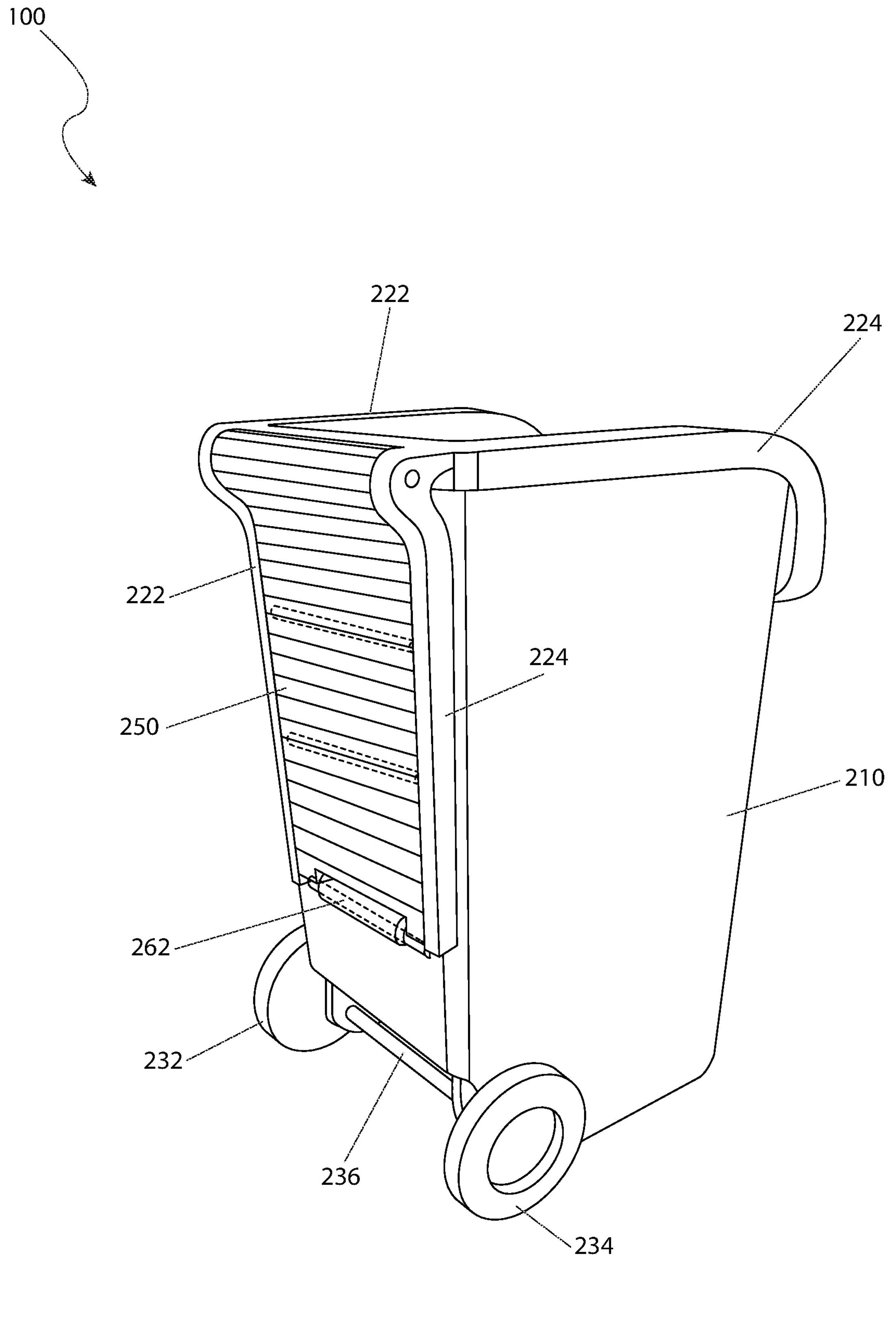
FIG. 3 is a rear isometric view of a garbage can lid and container 100, according to an embodiment of the present device; and, FIG. 4 is a rear isometric view of a garbage can lid and container 100, according to an embodiment of the present device, illustrating the clamp-on handle 270.
Figure 4:
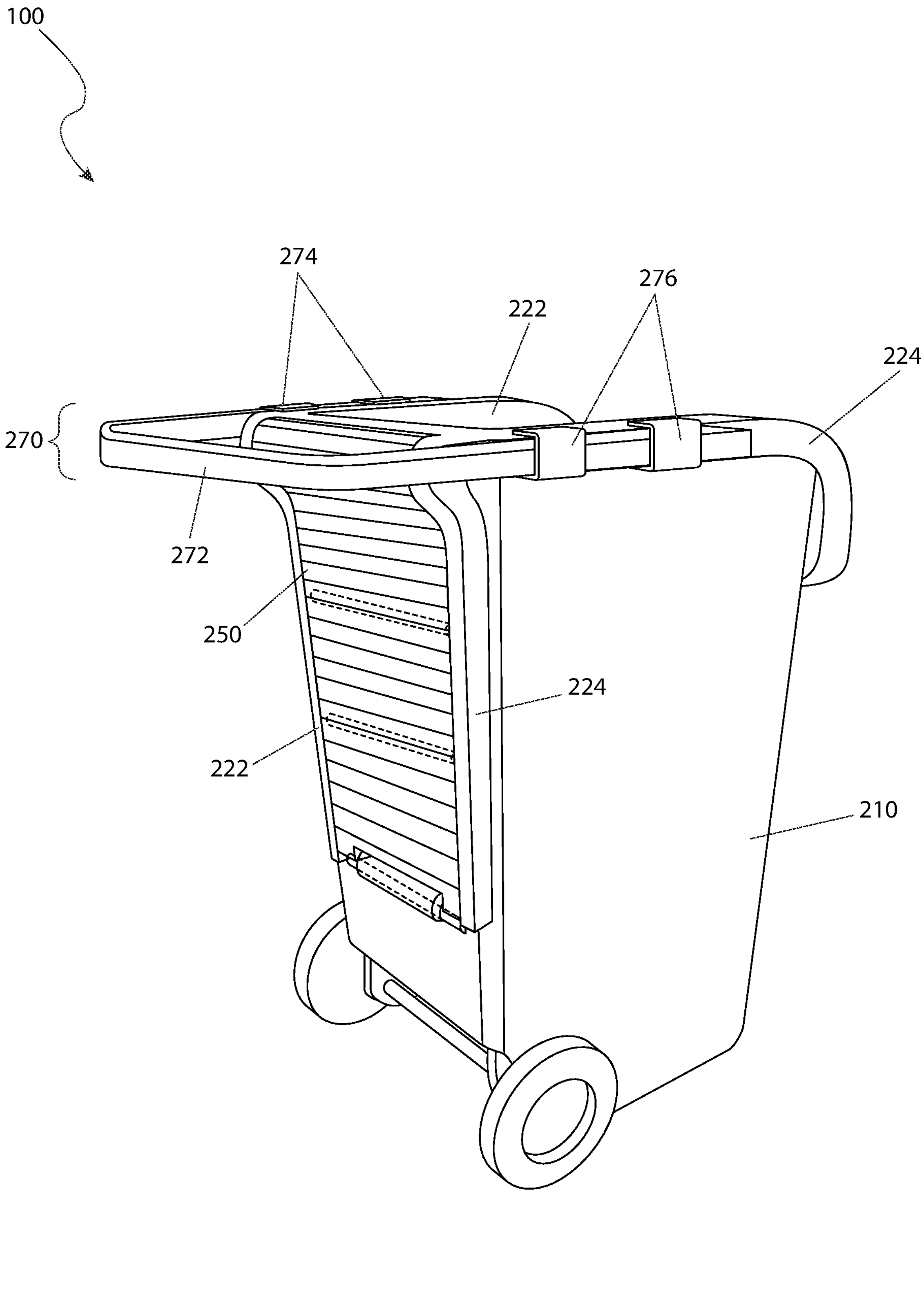

100 garbage can lid and container
200 garbage can
210 trash container
222 left side track
224 right side track
232 left wheel
234 right wheel
236 axle
238 lid latch
250 lid
254 panel segment
256 hinge
260 lid front handle
262 lid rear handle
270 clamp-on handle 272 handle bar
274 left side clamp
276 right side clamp
290 separation distance

DESCRIPTION OF THE DEVICE

The present device is directed to a garbage can lid and container (herein described as the "device") 100. The garbage can lid and container 100 may comprise a garbage can 200 and a lid 250. The garbage can 200 may be operable to store trash intended for collection by a garbage truck. The lid 250 may be a sliding shutter. The lid 250 may cover the top of the garbage can 200 to enclose the garbage can 200. As non-limiting examples, the lid 250 may prevent rain from entering the garbage can 200 and may prevent animals from accessing the trash placed into the garbage can 200. The lid 250 may open by sliding rearward to permit access to the interior of the garbage can 200. The lid 250 may be guided by a pair of tracks coupled to the garbage can 200. In some embodiments, the garbage can lid and container 100 may further comprise a clamp-on handle 270 that may be coupled to the garbage can 200 to facilitate moving the garbage can 200.

The garbage can 200 may comprise a trash container 210, the pair of tracks, a pair of wheels, and a lid latch 238. The trash container 210 may be a container comprising four (4) side panels, a bottom panel and an open top. The trash may be placed into and removed from the trash container 210 via the open top. The pair of tracks may be coupled to the top and rear of the trash container 210 to guide the lid 250. The pair of wheels may facilitate movement of the garbage can 200 by reducing friction. The lid latch 238 may be engaged to prevent the lid 250 from opening.

The pair of tracks may comprise a left side track 222 and a right side track 224. The left side track 222 may be coupled to the top and rear of the trash container 210 on a left side of the garbage can 200. The right side track 224 may be coupled to the top and rear of the trash container 210 on a right side of the garbage can 200.

An individual track selected from the left side track 222 and the right side track 224 may comprise a U channel that is rotated ninety degrees) (90°) such that the open side of the U channel is oriented to face the opposite side of the garbage can 200. The left side track 222 and the right side track 224 may follow congruent paths along the top of the trash container 210 and down the rear of the trash container 210 while maintaining a separation distance 290 which is constant. The separation distance 290 may conform to the width of the lid 250 such that the lid 250 may slide within the pair of tracks.

In some embodiments, the front of the trash container 210 may be lower than the sides of the trash container 210 for improved accessibility. The left side track 222 and the right side track 224 may partially extend down the front of the trash container 210 such that the lid 250 may slide down to cover the lowered front.

The left side track 222 and the right side track 224 may bend towards the center of the garbage can 200 at the front of the garbage can 200 and may be joined in the front of the garbage can 200. The bend may limit forward motion of the lid 250 during closing of the lid 250 where the separation distance 290 of the pair of tracks narrows.

The pair of wheels may reduce friction between the garbage can 200 and the ground. The pair of wheels may comprise a left wheel 232 and a right wheel 234 that may be rotationally coupled to the opposing ends of an axle 236. The axle 236 may be coupled to the bottom rear of the trash container 210 such that the garbage can 200 may be tilted back with only the pair of wheels touching the ground during movement.

The lid latch 238 may be coupled to the front center of the trash container 210. The lid latch 238 may pivot between an engaged position and a disengaged position. In the engaged position, the lid latch 238 may capture a lid front handle 260 and may prevent the lid 250 from sliding. In the disengaged position, the lid latch 238 may release the lid front handle 260 and may permit the lid 250 to slide.

The lid 250 may be an articulated panel that fits between the left side track 222 and the right side track 224. The lid 250 may slide within the pair of side tracks 222, 224 to prevent access to the interior of the trash container 210 by covering the open top of the garbage can 200 and to permit access to the interior of the trash container 210 by uncovering the open top. The articulation of the lid 250 may enable the lid 250 to bend as the lid 250 traverses the pair of side tracks 222, 224 between the top of the trash container 210 and the rear of the trash container 210 while following the pair of side tracks 222, 224. In some embodiments, the lid 250 may be inserted into and removed from the pair of side tracks 222, 224 at the bottom rear of the garbage can 200 where the pair of side tracks 222, 224 end.

As a non-limiting example, the lid 250 may comprise a plurality of panel segments 254 that may be pivotably coupled to each other by a plurality of hinges 256. An individual panel segment 254 may be oriented to extend laterally between the pair of side tracks 222, 224. The opposing ends of the individual panel segment 254 may slide within the pair of side tracks 222, 224. The plurality of hinges 256 may enable the plurality of panel segments 254 to pivot relative to one (1) another such that the lid 250 is able to bend as the direction of the pair of side tracks 222, 224 changes.

In some embodiments, the plurality of panel segments 254 and the plurality of hinges 256 may be molded from a single piece of plastic. As a non-limiting example, the plurality of hinges 256 may be living hinges.

The lid 250 may comprise the lid front handle 260. The lid front handle 260 may be located on the top surface of the lid 250 at the front of the lid 250. The lid front handle 260 may be adapted for a user to grasp while opening and closing the lid 250.

In some embodiments, the lid 250 may comprise a lid rear handle 262. The lid rear handle 262 may be located on the top surface of the lid 250 at the rear of the lid 250. The lid rear handle 262 may be adapted for the user to grasp while opening and closing the lid 250.

In some embodiments, the garbage can lid and container 100 may further comprise the clamp-on handle 270. The clamp-on handle 270 may be detachably coupled to the garbage can 200 in order to facilitate moving the garbage can 200. The clamp-on handle 270 may be detached and removed once the garbage can 200 is to remain stationary. The clamp-on handle 270 may comprise a handle bar 272, one (1) or more left side clamps 274, and one (1) or more right side clamps 276. The handle bar 272 may be a U-shaped armature that may couple to the left side track 222 and to the right side track 224 and may extend laterally across the rear of the garbage can 200, separated from the garbage can 200 by a gap. The left side clamps 274 may detachably couple the handle bar 272 to the left side track 222 and the right side clamps 276 may detachably couple the handle bar 272 to the right side track 224. The handle bar 272 may be adapted to be grasped by the user in order to move the garbage can 200. The gap between the handle bar 272 and the garbage can 200 may provide space for grasping.

In use, the garbage can 200 may be opened by sliding the lid 250 to the rear. The lid 250 may slide within the pair of tracks to a position that is substantially behind the garbage can 200. Trash may be placed into the garbage can 200 through the open top. The garbage can 200 may be closed by sliding the lid 250 to the front. To move the garbage can 200 the clamp-on handle 270 may be attached to the top of the garbage can 200 using the left side clamps 274 and the right side clamps 276. As a non-limiting example, the clamp-on handle 270 may be coupled to the garbage can 200 to move the garbage can 200 to and from a curb and may be removed from the garbage can 200 at other times.

The exact specifications, materials used, and method of use of the garbage can lid and container 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A garbage can lid and container, comprising:

a garbage can having four side panels, a bottom panel, and an open top;

a sliding shutter lid configured to cover the open top;

a pair of tracks coupled to a top edge and rear surface of the garbage can, wherein the pair of tracks each comprise a U-channel positioned such that the open side of the U-channel faces the opposite track, the pair of tracks maintaining a constant separation distance conforming to the width of the sliding shutter lid, thereby allowing the sliding shutter lid to slide within the tracks; and, a lid latch coupled to the front center of the garbage can, wherein the lid latch is operable to pivot between an engaged position to prevent the sliding shutter lid from sliding and a disengaged position to allow the sliding shutter lid to slide; and, wherein the garbage can is adapted to tilt rearward such that a pair of wheels rotationally coupled to a rear axle of the garbage can engage the ground to reduce friction during movement;

wherein the sliding shutter lid comprises a plurality of panel segments pivotably coupled to each other by living hinges, the panel segments configured to slide within the pair of tracks; and, wherein the pair of tracks partially extend down a front surface of the garbage can, where the pair of tracks bend towards the center of the garbage can and are joined at the front surface, thereby limiting forward motion of the sliding shutter lid when closing.

* * * * *